United States Patent Office 3,210,377
Patented Oct. 5, 1965

3,210,377
GAMMA LACTONES
Hans Machleidt, Bonn, Germany, assignor to Olin Mathieson Chemical Corporation, New York, N.Y., a corporation of Virginia
No Drawing. Filed June 5, 1963, Ser. No. 285,592
5 Claims. (Cl. 260—343.6)

This invention relates to novel lactones and to a method for producing them. More particularly, the invention relates to compounds of the formula (I) 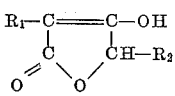

$R_1$ and $R_2$ in the above formula represent alkyl or alkenyl and $R_2$ represents hydrogen in addition.

The alkyl and alkenyl groups represented by $R_1$ and up to about 12 carbon atoms and up to three double bonds $R_2$ are straight or branched chain aliphatic groups having in the chain. Five to ten carbon atom chains and mono and di-olefinic chains are preferred. In its more preferred aspect, $R_2$ represents hydrogen and $R_1$ represents an alkenyl group. In addition to groups such as methyl, ethyl, propyl, isopropyl, octyl, allyl, pentenyl, decenyl and the like, $R_1$ and $R_2$ include such groups as 3-methyl-2-butenyl, 3,7-dimethyl-2,6-octadienyl and the like.

The new compounds of Formula I are produced by alkaline hydroylsis of an α-alkyl or α-alkenyl substituted γ-halo-β-keto acid ester of the formula (II) 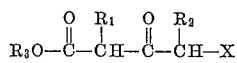

$R_1$ and $R_2$ in Formula II have the same meaning as in Formula I. $R_3$ represents alkyl, preferably lower alkyl, phenyl and cycloalkyl, preferably cycloalkyl of 3 to 6 carbon atoms. X represents chlorine or fluorine, preferably the latter.

The esters of Formula II must be capable of forming an enolate. Only α-monosubstituted esters can be used.

The alkaline hydrolysis of II is carried out with about an equimolar proportion of alkali, e.g. alkaline metal or alkaline earth metal hydroxide such as sodium or calcium hydroxide, in water, optionally in the presence of a water miscible solvent such as alcohol, dioxane or tetrahydrofuran. A temperature of about 50 to 100° C. is advantageous for the hydrolysis.

In the course of the reaction acyclic ketones are formed as byproducts. These ketones can be extracted from the reaction mixture with a solvent such as petroleum ether. After their separation, the reaction mixture is acidified. The oily or crystalline lactones which separate are filtered or extracted with a solvent such as chloroform or ethers.

The new compounds of this invention are biologically active substances which inhibit the transformation of mevalonic acid into sterols. They may be used orally as hypocholesteremic agents for inhibiting cholesterol biosynthesis and for regulating the cholesterol level in the blood in conditions such as atherosclerosis.

The starting materials of Formula II are obtained by the alkylation of γ-halo-β-keto acid esters in alcoholic or ether solution in the presence of bases such as alkali metal alkoxides, e.g. sodium ethoxide.

The following examples are illustrative of the invention. Temperatures are expressed on the centigrade scale.

EXAMPLE 1

2-(1,2-dihydroxyethylidene)-5-methyl-4-hexenoic acid-γ-lactone 256 g. (1.73 moles) of ethyl γ-fluoroacetoacetate (J. Chem. Soc., 1959, 3278) and 258 g. (1.73 moles) of β,β-dimethylallyl bromide are mixed and cooled to —10°.

A solution of 39.8 g. of sodium in 800 ml. of dry ethanol is added dropwise. After filtering off under suction the precipitated sodium bromide, washing with ethanol and concentrating the filtrate in vacuo at 40°, water is added, the mixture is acidified with acetic acid and the ester is shaken with chloroform. After washing with water, drying and evaporating the solvent in vacuo, distillation of the residual oil in vacuo is a Vigreux column gives 229 g. (61% of theory) of 2-fluoroacetyl-5-methyl-4-hexenoic acid ethyl ester, boiling point 55–58°.

$C_{11}H_{17}FO_3$ (216.2), calcd.: C, 61.08; H, 7.93. Found: C, 61.15; H, 7.80.

262 grams (1.2 moles) of 2-fluoroacetyl-5-methyl-4-hexenoic acid ethyl ester are heated in a solution of 58 grams (1.45 moles) of sodium hydroxide in 1500 ml. of water-methanol mixture 1:1 for four hours with stirring at reflux. After cooling, the methanol is removed by distillation in vacuo and the neutral ketonic fractions are extracted with petroleum ether. Acidification of the water solution and extraction of the separated oil with choloroform after washing with water and evaporating the solvent in vacuo yields a crystalline residue, which is recrystallized from benzene yielding 102 grams (49% of the theoretical) of 2-(1,2-dihydroxyethylidene)-5-methyl-4-hexenoic acid-γ-lactone as needles melting at 118°.

$C_9H_{12}O_3$ (168.2), calcd.: C, 64.27; H, 7.19. Found: C, 64.04; H, 7.29.

EXAMPLE 2

2-(1,2-dihydroxyethylidene)-5,9-dimethyl-4,8-decadienoic acid-γ-lactone 366 g. of geranyl bromide [prepared from 300 g. of geraniol and 175 g. of phosphorus tribromide in 1 l. of petroleum ether at —5° in the presence of 5 ml. of pyridine by the method of Mondon, Chem. Ber. 88, 724 (1955)] and 250 g. of ethyl γ-fluoroacetoacetate are admixed and a solution of 39 g. of sodium in 800 ml. of dry ethanol is added dropwise at —10° with stirring. The sodium bromide formed is filtered off under suction. The product, 2-fluoroacetyl-5,9-dimethyl-4,8-decadienoic acid ethyl ester is worked up as described in the first paragraph of Example 1.

62 grams (0.218 mole) of 2-fluoroacetyl-5,9-dimethyl-4,8-decadienoic acid ethyl ester are refluxed in a solution of 10.5 g. of sodium hydroxide (0.262 mole) in 500 ml. of water and 500 ml. of methanol for three hours. Working up as described in Example 1 yields, after crystallizing the acid residue from benzene-cyclohexane and ether, 27.8 grams (45% of the theoretical) of 2-(1,2-dihydroxyethylidene)-5,9-dimethyl-4,8-decadienoic acid-γ-lactone melting at 76–83°. After recrystallisation from ether, the melting point rises to 84–86°.

$C_{14}H_{20}O_3$ (236.3), calcd.: C, 71.16; H, 8.53. Found: C, 70.87; H, 8.56.

What is claimed is:

1. 2 - (1,2 - dihydroxyethylidene) - 5 - methyl - 4 - hexenoic acid-γ-lactone.

2. 2 - (1,2 - dihydroxyethylidene) - 5,9 - dimethyl - 4, 8-decadienoic acid-γ-lactone.

3. A process for the production of a compound of the formula

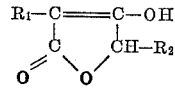

wherein $R_1$ is alkenyl having 2 to 12 carbon atoms and 1 to 3 double bonds and $R_2$ is a member of the group consisting of hydrogen, alkyl having 1 to 12 carbon atoms, alkenyl having 2 to 12 carbon atoms and 1 to 3 double bonds, which comprises hydrolyzing in alkaline medium in a water miscible solvent a compound of the formula

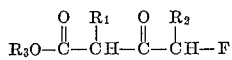

wherein $R_1$ and $R_2$ have the same meaning as above and $R_3$ is a member of the group consisting of lower alkyl, phenyl and cycloalkyl having 3 to 6 carbon atoms, and separating the product from the reaction mixture.

4. A process for the production of 2-(1,2-dihydroxyethylidene) - 5 - methyl - 4 - hexenoic acid - γ - lactone which comprises hydrolyzing 2-fluoroacetyl-5-methyl-4-hexenoic acid ethyl ester in sodium hydroxide solution.

5. A process for the production of 2-(1,2-dihydroxyethylidene) - 5,9 - dimethyl - 4,8 - decadienoic acid - γ- lactone which comprises hydrolyzing 2-fluoroacetyl-5,9-dimethyl-4,8-decadienoic acid ethyl ester in sodium hydroxide solution.

References Cited by the Examiner
UNITED STATES PATENTS 2,485,100  10/49  Ladd et al. _____ 260—343.6

OTHER REFERENCES

Beilstein Organische Chemie, Original work (1933), vol. 17, pages 413 and 420.

Els et al.: Jour. Amer. Chem. Soc., vol. 80 (1958), pages 868–80.

WALTER A. MODANCE, *Primary Examiner.*
NICHOLAS S. RIZZO, *Examiner.*

UNITED STATES PATENT OFFICE
CERTIFICATE OF CORRECTION

Patent No. 3,210,377            October 5, 1965

Hans Machleidt

It is hereby certified that error appears in the above numbered patent requiring correction and that the said Letters Patent should read as corrected below.

Column 1, lines 19 and 20, for "up to about 12 carbon atoms and up to three double bonds $R_2$ are straight or branched chain aliphatic groups having" read -- $R_2$ are straight or branched chain aliphatic groups having up to about 12 carbon atoms and up to three double bonds --.

Signed and sealed this 3rd day of May 1966.

(SEAL)
Attest:

ERNEST W. SWIDER            EDWARD J. BRENNER
Attesting Officer            Commissioner of Patents